(12) United States Patent
Suzuki et al.

(10) Patent No.: US 12,384,382 B2
(45) Date of Patent: Aug. 12, 2025

(54) INFORMATION PROVIDING DEVICE

(71) Applicant: HONDA MOTOR CO., LTD., Tokyo (JP)

(72) Inventors: Atsuyuki Suzuki, Wako (JP); Akira Terauchi, Wako (JP); Koji Toumiya, Wako (JP); Naoko Imai, Wako (JP); Ryo Saiki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 311 days.

(21) Appl. No.: 17/911,806

(22) PCT Filed: Mar. 18, 2020

(86) PCT No.: PCT/JP2020/012087
§ 371 (c)(1),
(2) Date: Sep. 15, 2022

(87) PCT Pub. No.: WO2021/186636
PCT Pub. Date: Sep. 23, 2021

(65) Prior Publication Data
US 2023/0126215 A1    Apr. 27, 2023

(51) Int. Cl.
*B60W 40/09* (2012.01)
*G01C 21/34* (2006.01)

(52) U.S. Cl.
CPC ......... *B60W 40/09* (2013.01); *G01C 21/3469* (2013.01); *B60W 2540/30* (2013.01)

(58) Field of Classification Search
CPC .............. B60W 40/09; B60W 2540/30; G01C 21/3469

(Continued)

(56) References Cited

U.S. PATENT DOCUMENTS 8,855,912 B2 * 10/2014 Miura ................ G01C 21/3469
    701/534
9,037,313 B2 * 5/2015 Inoue ................ G07C 9/00309
    701/2

(Continued)

FOREIGN PATENT DOCUMENTS

CN      110322031 A     10/2019
CN      110753948 A     2/2020

(Continued)

OTHER PUBLICATIONS

English Translation of International Preliminary Report on Patentability dated Sep. 29, 2022 issued in corresponding International application No. PCT/JP2020/012087 (5 pages).

(Continued)

*Primary Examiner* — Luis A Martinez Borrero
(74) *Attorney, Agent, or Firm* — Rankin, Hill & Clark LLP

(57) ABSTRACT

An information providing device for use in a moving body includes: a user behavior recognition unit configured to recognize a behavior of a user boarding on the moving body; a recommendation information output unit configured to output recommendation information for a prescribed service when the user behavior recognition unit recognizes a specific behavior estimated to be a behavior of the user getting off the moving body; a service request reception unit configured to receive a request for the prescribed service when the recommendation information output unit outputs the recommendation information.

10 Claims, 11 Drawing Sheets

(58) Field of Classification Search
USPC .......................................................... 701/1
See application file for complete search history.

(56) References Cited

U.S. PATENT DOCUMENTS

| | | | | |
|---|---|---|---|---|
| 9,103,687 | B1* | 8/2015 | Loo ................. | G06Q 10/06313 |
| 9,374,679 | B2* | 6/2016 | Song ................... | B60W 50/08 |
| 10,011,279 | B2* | 7/2018 | Bredberg .......... | B60W 30/1882 |
| 10,352,712 | B1* | 7/2019 | Loo .......................... | F17D 1/04 |
| 10,897,510 | B2* | 1/2021 | Shinozaki ............... | H04L 67/12 |
| 11,574,208 | B2* | 2/2023 | Javeri ...................... | G06N 5/04 |
| 2011/0196601 | A1* | 8/2011 | Miura ................. | G01C 21/3697 |
| | | | | 701/532 |
| 2013/0158744 | A1* | 6/2013 | Inoue ................ | G07C 9/00309 |
| | | | | 701/2 |
| 2015/0133164 | A1* | 5/2015 | Song .................... | B60W 50/14 |
| | | | | 709/217 |
| 2017/0008468 | A1* | 1/2017 | Lindhuber .......... | B60L 15/2045 |
| 2018/0304742 | A1* | 10/2018 | Maruthapillai ........ | B60K 15/00 |
| 2019/0086223 | A1* | 3/2019 | Tanaka .................... | G06F 16/00 |
| 2019/0303805 | A1 | 10/2019 | Mizutani et al. | |
| 2020/0065679 | A1* | 2/2020 | Javeri ................ | G01C 21/3617 |
| 2020/0211043 | A1* | 7/2020 | Hori ..................... | G08G 1/0112 |
| 2021/0150656 | A1 | 5/2021 | Yasui et al. | |
| 2022/0194400 | A1* | 6/2022 | Gee ........................ | G06V 10/82 |
| 2022/0194401 | A1* | 6/2022 | Gee ....................... | B60W 50/10 |

FOREIGN PATENT DOCUMENTS

| | | |
|---|---|---|
| JP | 2002-225994 | 8/2002 |
| JP | 2011-122849 | 6/2011 |
| JP | 2014-238290 | 12/2014 |
| JP | 2018-525700 | 9/2018 |

OTHER PUBLICATIONS

International Search Report, International Application No. PCT/JP2020/012087, Date of mailing: Aug. 4, 2020, 2 pages.

Written Opinion of the International Searching Authority dated Aug. 4, 2020 filed in PCT/JP2020/012087, 3 pages.

Chinese Office Action dated May 19, 2025 issued in corresponding Chinese application No. 202080097633.2; 8 pages.

* cited by examiner

INFORMATION PROVIDING DEVICE

TECHNICAL FIELD

The present disclosure relates to an information providing device.

BACKGROUND ART

Conventionally, an information notification device to be mounted on a vehicle has been proposed (see, for example, Patent Literature 1). The information notification device is configured to notify information, such as security information, traffic congestion information, shopping information, and event information, as information related to the location where the vehicle is parked, at the timing when a user gets off the vehicle.

A fuel delivery system has also been proposed, which arranges a refueling vehicle that travels to the location of user's vehicle for refueling in response to a delivery request from the user (see, for example, Patent Literature 2).

CITATION LIST

Patent Literature

[Patent Literature 1]
Japanese Patent Laid Open No. 2011-122849
[Patent Literature 2]
Japanese Patent Laid Open No. 2018-525700

SUMMARY OF INVENTION

Technical Problem

The information notification device disclosed in Patent Literature 1 only notifies the information related to the parking location of a vehicle. Accordingly, when a user recognizes the information as useful, the user needs to consider an action to take in order to make good use of the information. Therefore, there is room for improvement in efficient use of information. The fuel delivery system disclosed in Patent Literature 2 arranges delivery of fuel in response to a delivery request from a user. This causes an inconvenience that the vehicle is continuously in an out-of-fuel state when the user forgets to request delivery.

The present invention has been made in view of such background circumstances, and it is an object of the present invention to provide an information providing device capable of providing recommendation information to a user of a moving body at appropriate timing and encouraging the user to make good use of the recommendation information.

Solution to Problem

A first aspect in order to accomplish the above object is an information providing device for use in a moving body. The information providing device includes: a user behavior recognition unit configured to recognize a behavior of a user boarding on a moving body; a recommendation information output unit configured to output recommendation information for a prescribed service when the user behavior recognition unit recognizes a specific behavior estimated to be a behavior of the user getting off the moving body; and a service request reception unit configured to receive a request for the prescribed service when the recommendation information output unit outputs the recommendation information.

In the information providing device, the recommendation information output unit may be configured to output the recommendation information by displaying a recommendation screen containing a content of the prescribed service on a display unit provided in the moving body, and the service request reception unit may be configured to display a request reception area for the prescribed service on the recommendation screen, and receive a request for the prescribed service when a selecting operation is performed in the request receiving area.

The information providing device may be configured to include a communication control unit, the communication control unit being configured to control a communication unit used in the moving body, and transmit, when the service request reception unit receives the request for the prescribed service, service request information for requesting the prescribed service to a service management server that manages provision of the prescribed service via the communication unit.

In the information providing device, the prescribed service may be configured to be a refueling service or a power supply service for the moving body.

In the information providing device, the recommendation information may be configured to include an estimated cost of the fueling service or the power supply service.

The information providing device may be configured to include a movable distance recognition unit configured to recognize a movable distance with a remaining oil amount or a remaining electric storage amount of the moving body. The recommendation information may be configured to include the movable distance.

In the information providing device, the service request reception unit may be configured to unlock a lid of a fuel filler port or a power supply port provided on the moving body, when receiving the request for the prescribed service.

The information providing device may be configured to include a user terminal recognition unit configured to recognize that a user terminal carried and used by the user is inside a cabin of the moving body. The recommendation information output unit may be configured to output the recommendation information, when the user terminal recognition unit does not detect that the user terminal is inside the cabin of the moving body and the user behavior recognition unit recognizes the specific behavior of the user.

The information providing device may be configured to include a speed recognition unit configured to recognize speed of the moving body. The recommendation information output unit may be configured to output the recommendation information, when the speed of the moving body recognized by the speed recognition unit is a prescribed speed or less, and the user behavior recognition unit recognizes the specific behavior.

In the information providing device, the recommendation information output unit may be configured to stop output of the recommendation information, when the user behavior recognition unit recognizes that the user gets off the moving body during output of the recommendation information.

Next, a second aspect in order to accomplish the above object is an information providing device for use in a moving body. The information providing device includes: a user behavior recognition unit configured to recognize a behavior of a user boarding on the moving body; a recommendation information output unit configured to output recommendation information for a first prescribed service until a first prescribed period elapses from a point of time when the user behavior recognition unit recognizes a specific behavior estimated to be a behavior of the user getting off the moving body, and output recommendation information for a second prescribed service that is lower in priority than the first prescribed service during a second prescribed period set outside the first prescribed period.

The information providing device of the second aspect may be configured to include a service reception unit configured to receive a request for the first prescribed service during the first prescribed period, and prohibit reception of a request for the second prescribed service during the second prescribed period.

Advantageous Effects of Invention

According to the information providing device described above, at the timing when the user is freed from traveling by the moving body and relaxed, the recommendation information output unit outputs recommendation information for a prescribed service. This makes it possible to increase an appealing effect to the user. When the user desires the prescribed service, the user can request the prescribed service on the spot. Therefore, it is possible to provide recommendation information to the user of the moving body at appropriate timing and encourage the user to make good use of the recommendation information.

DESCRIPTION OF EMBODIMENT

Figure 1:
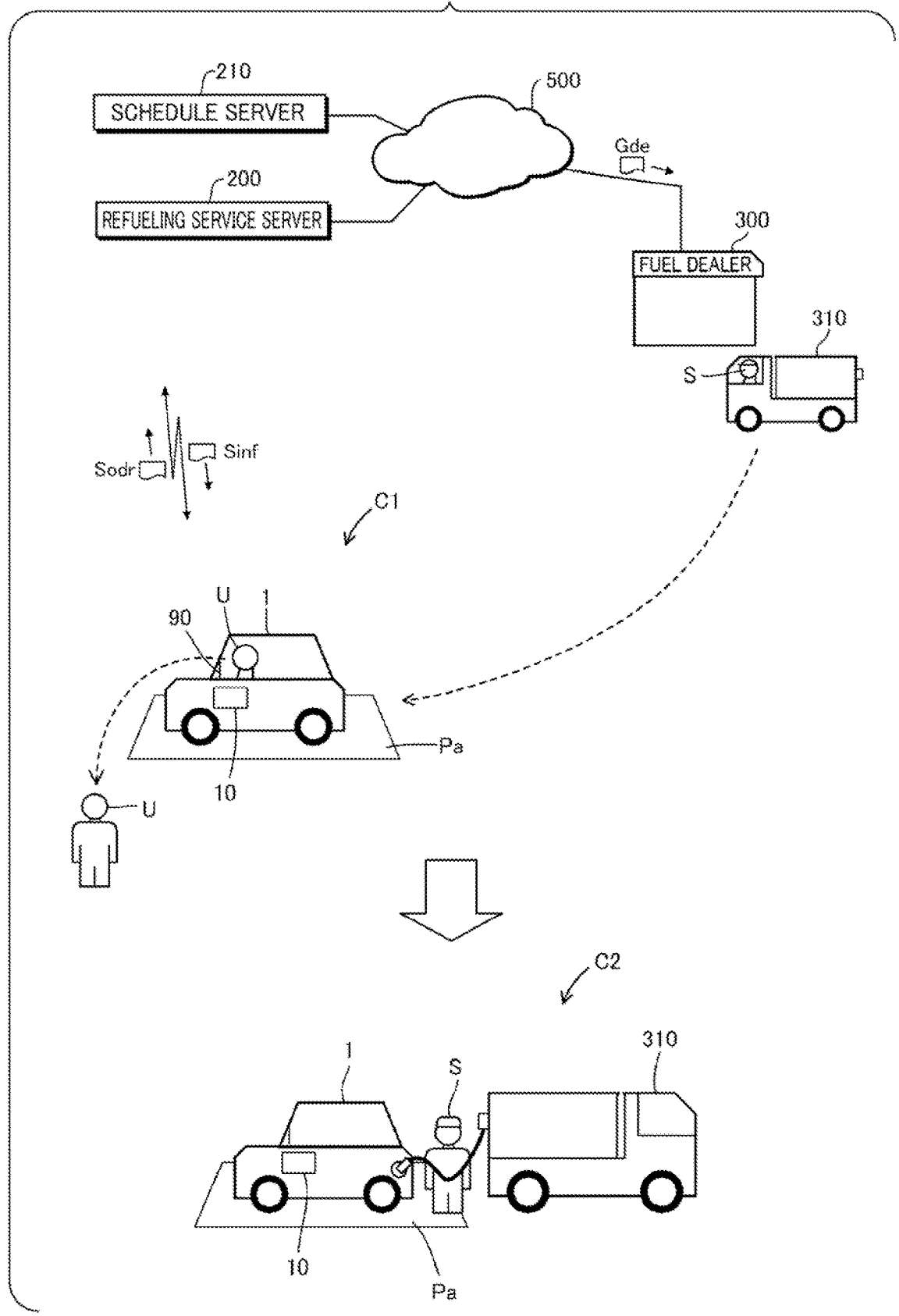
FIG. 1 is an explanatory view about providing information on a gasoline delivery service by an information providing device.

1. Providing Information on Gasoline Delivery Service by Information Providing Device With reference to FIG. 1, an aspect of providing information on a gasoline delivery service by an information providing device 10 in this embodiment will be described. The gasoline delivery service corresponds to the prescribed service of the present invention. The information providing device 10 is mounted on a vehicle 1 to display a recommendation screen of the gasoline delivery service on a touchpanel 90. The vehicle 1 corresponds to a moving body of the present invention.

The information providing device 10 performs communication between a refueling service server 200 (corresponding to the service management server of the present invention) that manages the gasoline delivery service by a fuel dealer 300, and a schedule server 210 that manages schedule information on a user U via a communication network 500.

As shown in C1 in FIG. 1, the information providing device 10 displays on the touchpanel 90 a recommendation screen for receiving a request for the gasoline delivery service at the timing when the vehicle 1 parks at a parking point Pa and a behavior of the user U getting off the vehicle 1 is recognized. The recommendation screen is created, as will be described later in detail, based on service information Sinf, such as gasoline prices, provided from the refueling service server 200, a schedule of the user U provided from the schedule server 210, or the like.

Here, in the situation from stop of the vehicle 1 to the user U getting off the vehicle 1, it is assumed that the user U, who has been driving the vehicle 1, is relieved from the tensions of driving and is relaxed, so that the user U naturally pays attention to the recommendation screen displayed on the touchpanel 90. Therefore, it is expected that an appealing effect of the recommendation screen is extremely high.

In the case where the user U wishes to receive the gasoline delivery service, the user U operates an order button displayed on the recommendation screen to request the gasoline delivery service, and then gets off the vehicle 1. The information providing device 10 transmits service request information Sodr to the refueling service server 200. The service request information Sodr includes position information of the parking point Pa that is a delivery destination of gasoline, identification information of the vehicle 1, and identification information of the user U. Upon reception of the service request information Sodr, the refueling service server 200 transmits, to the fuel dealer 300, delivery instruction information Gde that instructs execution of the gasoline delivery service for the vehicle 1.

The fuel dealer 300 arranges gasoline delivery to the vehicle 1 using a refueling vehicle 310 in accordance with the delivery instruction information Gde. A delivery staff S drives the refueling vehicle 310 to the parking point Pa of the vehicle 1, and fills the vehicle 1 with gasoline from the refueling vehicle 310 while the user U is not using the vehicle 1 (e.g. at night) as shown in C2. This allows the user U to make effective use of the period in which the vehicle 1 is not in use, for refueling the vehicle 1.

2. Vehicle Configuration

Figure 2:
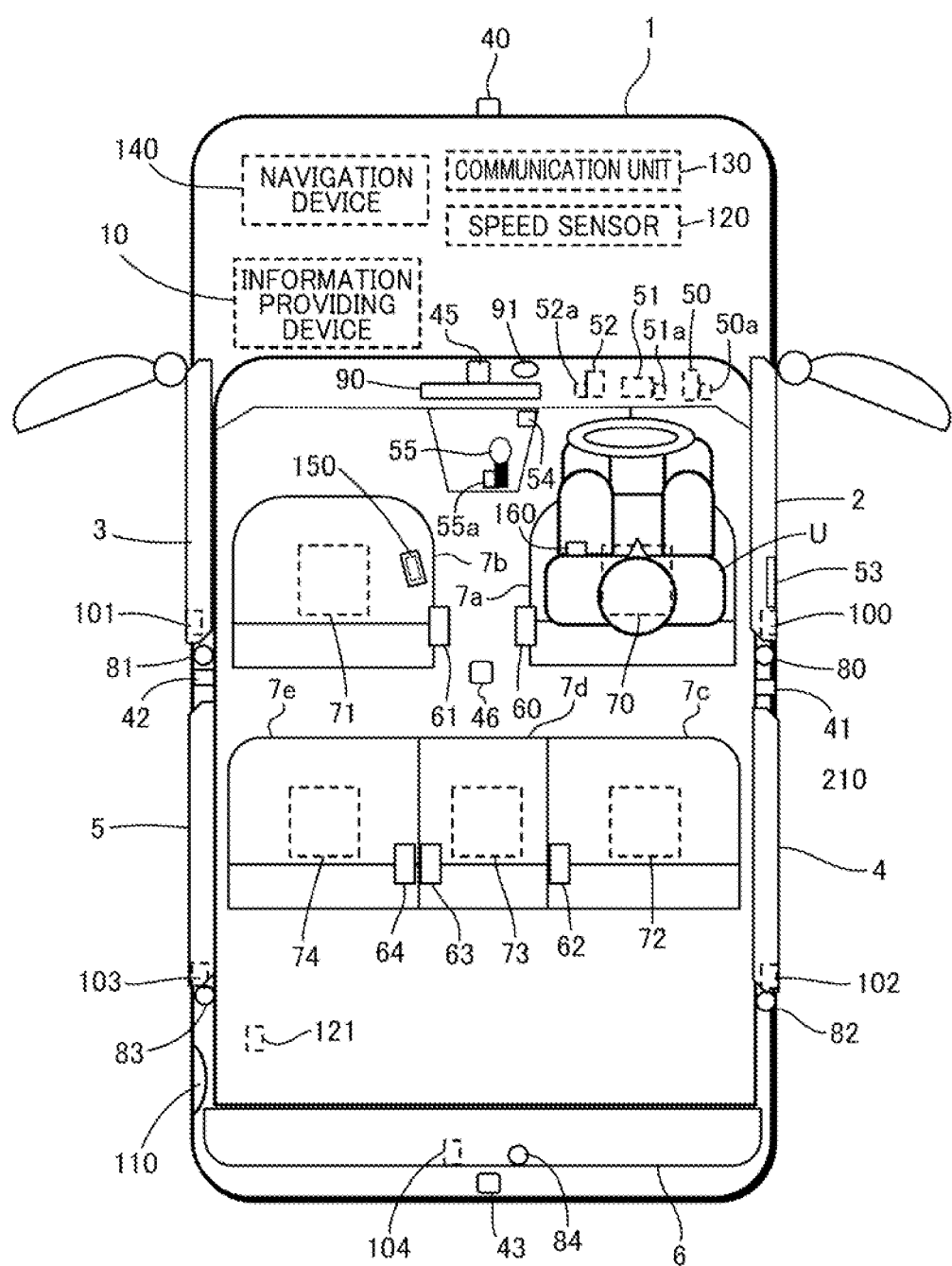
FIG. 2 is a configuration diagram of a vehicle mounted with the information providing device.

With reference to FIG. 2, the configuration of the vehicle 1 mounted with the information providing device 10 will be described. The vehicle 1, which is a passenger car with a capacity of five occupants, includes a driver seat 7a, a passenger seat 7b, a rear right seat 7c, a rear center seat 7d, and a rear left seat 7e. The seats 7a to 7e are respectively provided with seatbelt switches 60 to 64 that detect fastening/unfastening of seatbelts not shown, and seating sensors 70 to 74.

FIG. 2 shows the situation where the user U having a mobile key 160 of the vehicle 1 sits on the driver seat 7a. A user terminal 150 used by the user U is placed on the passenger seat 7b. The vehicle 1 is provided with a right front door 2, a left front door 3, a right rear door 4 and a rear left door 5. The right front door 2 has a door handle equipped with a door touch sensor 53. The user U having the mobile key 160 can unlock the doors 2 to 6 of the vehicle 1 by touching the door touch sensor 53.

At a front part of the vehicle 1, a front camera 40 is provided to photograph an area in front of the vehicle 1, and at a rear part of the vehicle 1, a rear camera 43 is provided to photograph an area in the rear of the vehicle 1. At a right part of the vehicle 1, a right side camera 41 is provided to photograph an area on a right lateral side of the vehicle 1, and at a left part of the vehicle 1, a left side camera 42 is provided to photograph an area on a left lateral side of the vehicle 1.

A dashboard in a vehicle cabin is provided with a front-seat camera 45 to photograph users sitting on the driver seat 7a and the passenger seat 7b, a touchpanel 90, and a speaker 91. The ceiling of the vehicle cabin is provided with a rear-seat camera 46 to photograph users sitting on the rear right seat 7c the rear center seat 7d and the rear left seat 7e.

The doors 2 to 5 are provided with the door switches 80 to 83 that detect opening and closing of the respective doors. A tailgate 6 is also provided with a door switch 85 that detects opening and closing of the tailgate 6. In addition, in the vicinity of the driver seat 7a, a power source switch 54, and a shift switch 55a that detects a shift position of a shift lever 55 are provided. The vehicle 1 also includes an accelerator pedal sensor 50a that detects stepping force applied to an accelerator pedal 50, a brake pedal sensor 51a that detects stepping force applied to a brake pedal 51, and a parking brake switch 52a that detects ON/OFF of a parking brake pedal 52.

The vehicle 1 further includes door locking mechanisms 100 to 104 that respectively lock the doors 2 to 5 and the tailgate 6, a fuel filler port lid 110 that is a lid of the fuel filler port (not shown), a speed sensor 120 that detects traveling speed of the vehicle 1, a communication unit 130, and a navigation device 140. The communication unit 130 performs communication with the user terminal 150, the mobile key 160, the refueling service server 200, and the like. The navigation device 140 has a global positioning system (GPS) sensor and map data, which are not shown, to execute route guidance to a destination, or the like, based on the position of the vehicle 1 detected by the GPS sensor and the map data.

3. Configuration of Information Providing Device

Figure 3:
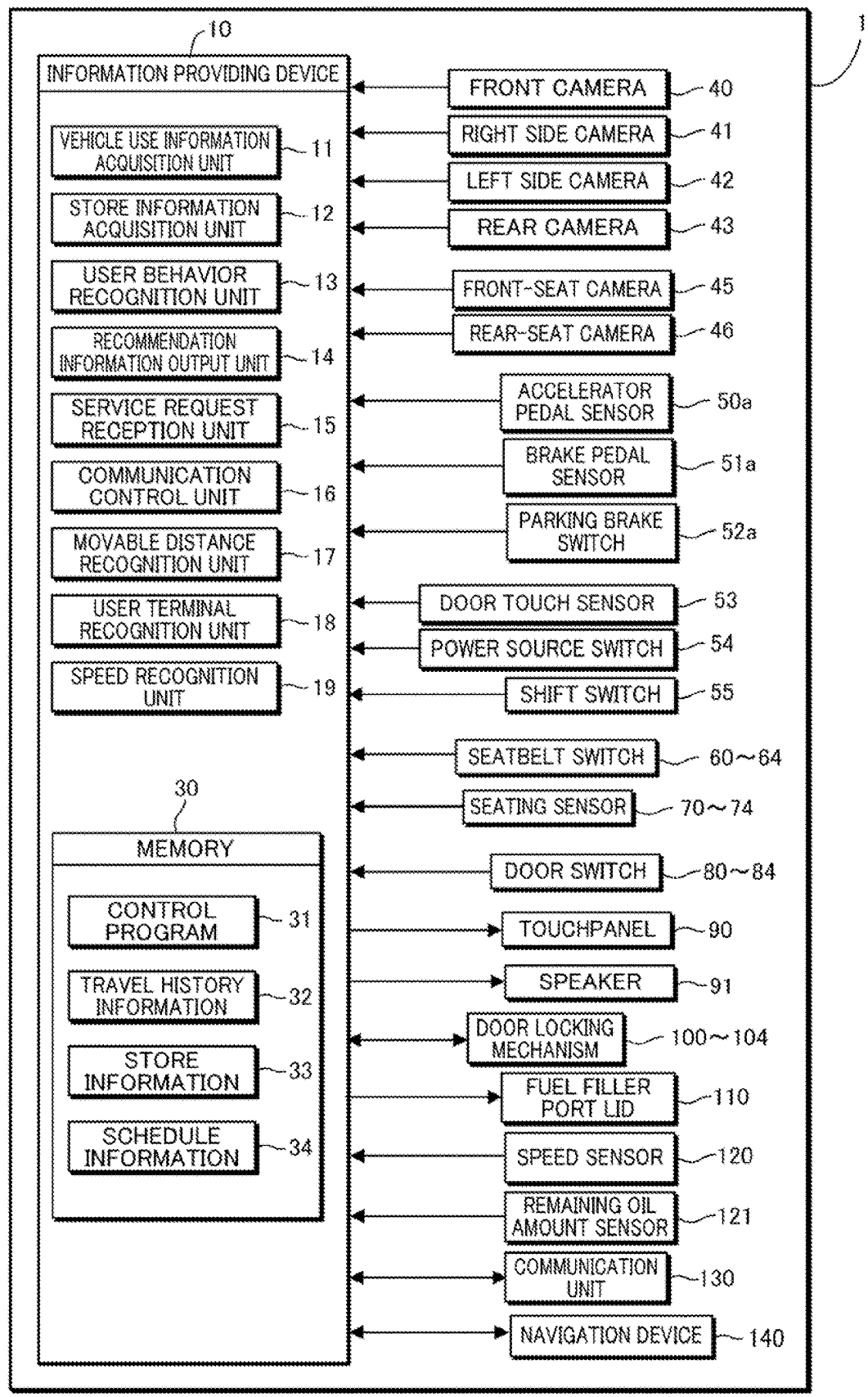
FIG. 3 is a configuration diagram of the information providing device.

With reference to FIG. 3, the configuration of the information providing device 10 will be described. The information providing device 10 is constituted of a central processing unit (CPU) which is not shown, a memory 30, an interface circuit which is not shown, and the like.

The information providing device 10 receives images around the vehicle 1, photographed by the front camera 40, the right side camera 41, the left side camera 42 and the rear camera 43. The information providing device 10 also receives images of the inside of the vehicle cabin of the vehicle 1 photographed by the front-seat camera 45 and the rear-seat camera 46.

The information providing device 10 further receives detection signals from the accelerator pedal sensor 50a, the brake pedal sensor 51a, the parking brake switch 52a, the door touch sensor 53, a power source switch 54, the shift switch 55a, the seatbelt switches 60 to 64, the seating sensors 70 to 74, and the door switches 80 to 84. The information providing device 10 also receives lock detection signals for the doors 2 to 5 and the tailgate 6 respectively from the door lock sensors (not shown) included in the door locking mechanisms 100 to 104.

The information providing device 10 also receives a touch position detection signal from the touchpanel 90, a speed detection signal from the speed sensor 120, an oil amount detection signal from a remaining oil amount sensor 121, and information on a current position (latitude, longitude) of the vehicle 1 detected by the navigation device 140.

Control signals output from the information providing device 10 control screen display on the touchpanel 90, sound (voice guidance, chime sound, etc.) output from the speaker 91, and unlocking of the fuel filler port lid 110. The information providing device 10 communicates with the user terminal 150, the mobile key 160, the refueling service server 200, and the schedule server 210, or the like, via the communication unit 130.

The CPU loads and executes a control program 31 of the information providing device 10 stored in the memory 30 so as to function as a vehicle use information acquisition unit 11, a store information acquisition unit 12, a user behavior recognition unit 13, a recommendation information output unit 14, a service request reception unit 15, a communication control unit 16, a movable distance recognition unit 17, a user terminal recognition unit 18, and a speed recognition unit 19. The memory 30 stores travel history information 32 of the vehicle 1, store information 33 about the stores that provide services, and schedule information 34 of the user U.

The vehicle use information acquisition unit 11 records the travel history of the vehicle 1, recognized by the navigation device 140, in the travel history information 32 in the memory 30, together with the fuel economy information. The store information acquisition unit 12 acquires, from the refueling service server 200, information on fuel dealers, or the like, which are frequently visited by the user U, and records the information in the store information 33 in the memory 30. The vehicle use information acquisition unit 11 also acquires the schedule of the user U, including a scheduled use of the vehicle 1 by the user U, from the schedule server 210, and records the schedule in the schedule information 34 in the memory 30.

The user behavior recognition unit 13 recognizes a behavior of the user U based on photographed images around the vehicle 1 by the front camera 40, the right side camera 41, the left side camera 42 and the rear camera 43, photographed images of the inside of the vehicle cabin of the vehicle 1 by the front-seat camera 45 and the rear-seat camera 46, detection signals from the accelerator pedal sensor 50a, the brake pedal sensor 51a, the parking brake switch 52a, the door touch sensor 53, the power source switch 54, the shift switch 55a, the seatbelt switches 60 to 64, the seating sensors 70 to 74, and the door switches 80 to 84, and lock detection signals or the like for the doors 2 to 5 and the tailgate 6 respectively from the door lock sensors (not shown) included in the door locking mechanisms 100 to 104.

The recommendation information output unit 14 displays a recommendation screen of the gasoline delivery service on the touchpanel 90, when the user behavior recognition unit 13 recognizes a specific behavior estimated to be a behavior of the user U getting off the vehicle 1. Displaying the recommendation screen on the touchpanel 90 corresponds to the output of the recommendation information. Note that the output of the recommendation information may be performed by audio output from the speaker 91.

The service request reception unit 15 receives a request for the gasoline delivery service in response to touch operation on an order button displayed on the recommendations screen. The communication control unit 16 controls communications via the communication unit 130. When the service request reception unit 15 receives a request for the gasoline delivery service, the communication control unit 16 transmits service request information Sodr (see FIG. 1) to the refueling service server 200 via the communication unit 130. Note that the user terminal 150 may be used as a communication unit.

The movable distance recognition unit 17 recognizes a movable distance with a current remaining amount of gasoline, based on the fuel economy of the vehicle 1 according to the travel history of the vehicle 1 recorded in the travel history information 32 so far and the remaining amount of gasoline detected by the remaining oil amount sensor 121. The user terminal recognition unit 18 recognizes that the user terminal 150 is in the vehicle cabin of the vehicle 1 based on a communication status of the communication unit 130. The speed recognition unit 19 recognizes the speed of the vehicle 1 based on the detection signal of the speed sensor 120.

4. Output of Recommendation Information

With reference to display screen examples of the touch-panel 90 in FIGS. 8 to 11, recommendation information output processing will be described in detail along the flowcharts shown in FIGS. 4 to 7.

Figure 4:
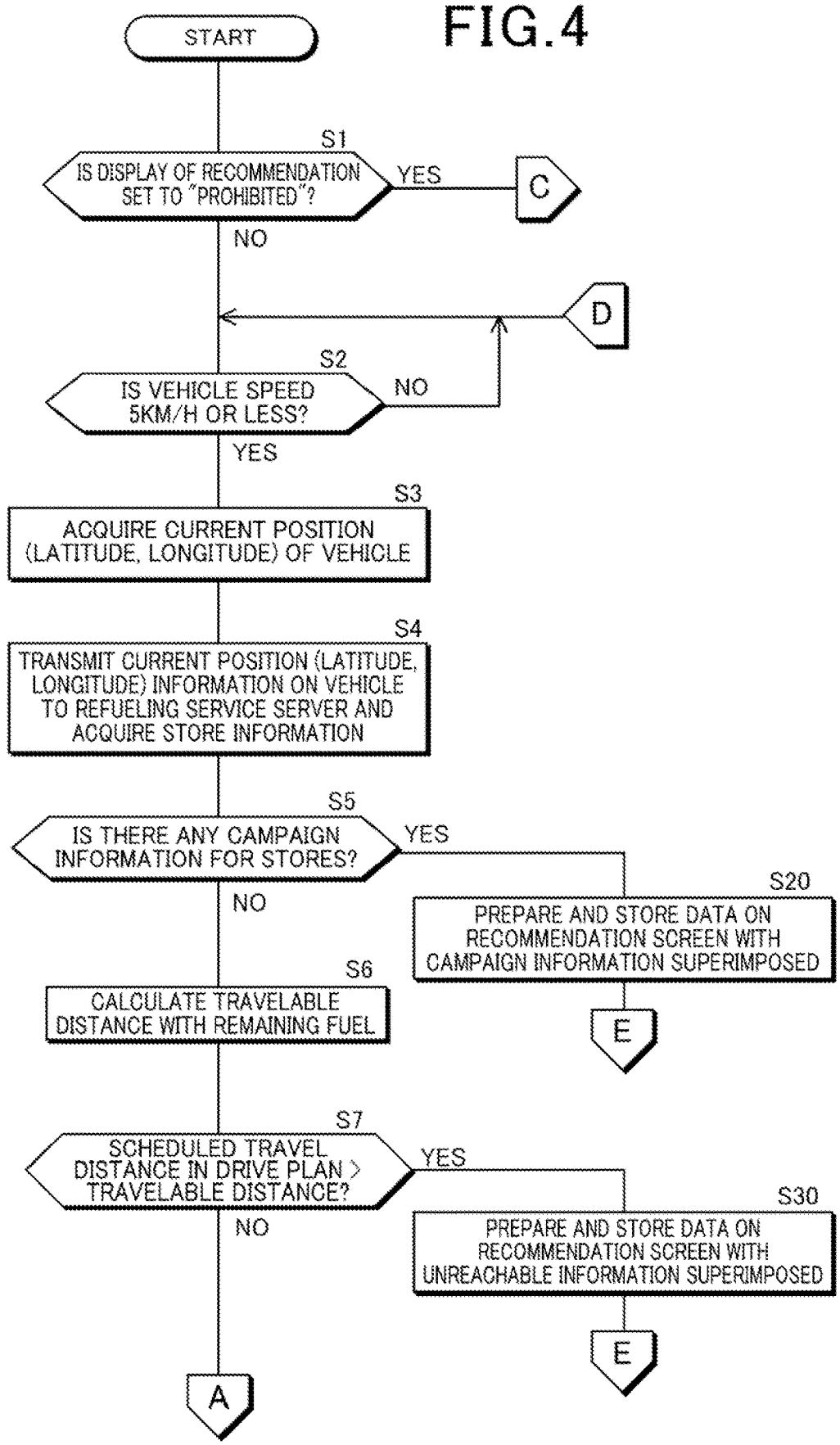
FIG. 4 is a first flowchart of recommendation information output processing.

In step S1 of FIG. 4, the recommendation information output unit 14 determines whether or not the user U has set display of recommendation to "prohibited". Then, the recommendation information output unit 14 advances the processing to step S70 of FIG. 7 when the display of recommendation is set to "prohibited", and advances the processing to step S2 when the display of recommendation is not "prohibited".

In step S2, the speed recognition unit 19 advances the processing to step S3 when recognizing that the vehicle speed of the vehicle 1 is a prescribed speed or less, preferably 5 km/h or less. In step S3, the store information acquisition unit 12 acquires a current position (latitude, longitude) of the vehicle 1 based on the position detection signal of the GPS sensor in the navigation device 140. Next, in following step S4, the store information acquisition unit 12 transmits the current position of the vehicle 1 to the refueling service server 200, acquires information about available gasoline delivery services, and records the information in the store information 33 in the memory 30.

In next step S5, the recommendation information output unit 14 refers to the store information 33 to determine whether or not there is any campaign information on the stores, such as special sale. Then, the recommendation information output unit 14 advances the processing to step S20 when there is any campaign information, and advances the processing to step S6 when there is no campaign information.

Figure 5:
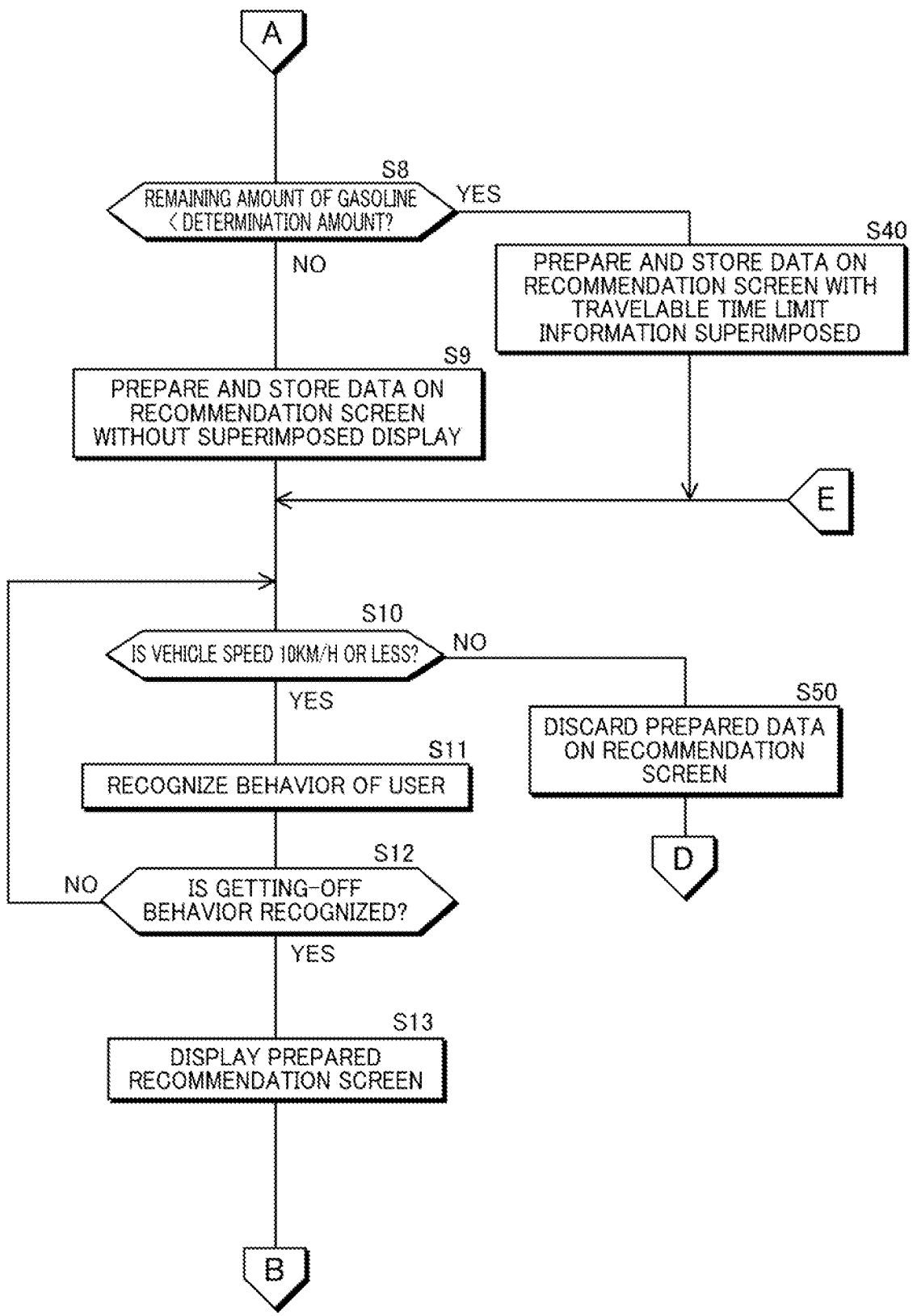
FIG. 5 is a second flowchart of the recommendation information output processing.
Figure 6:
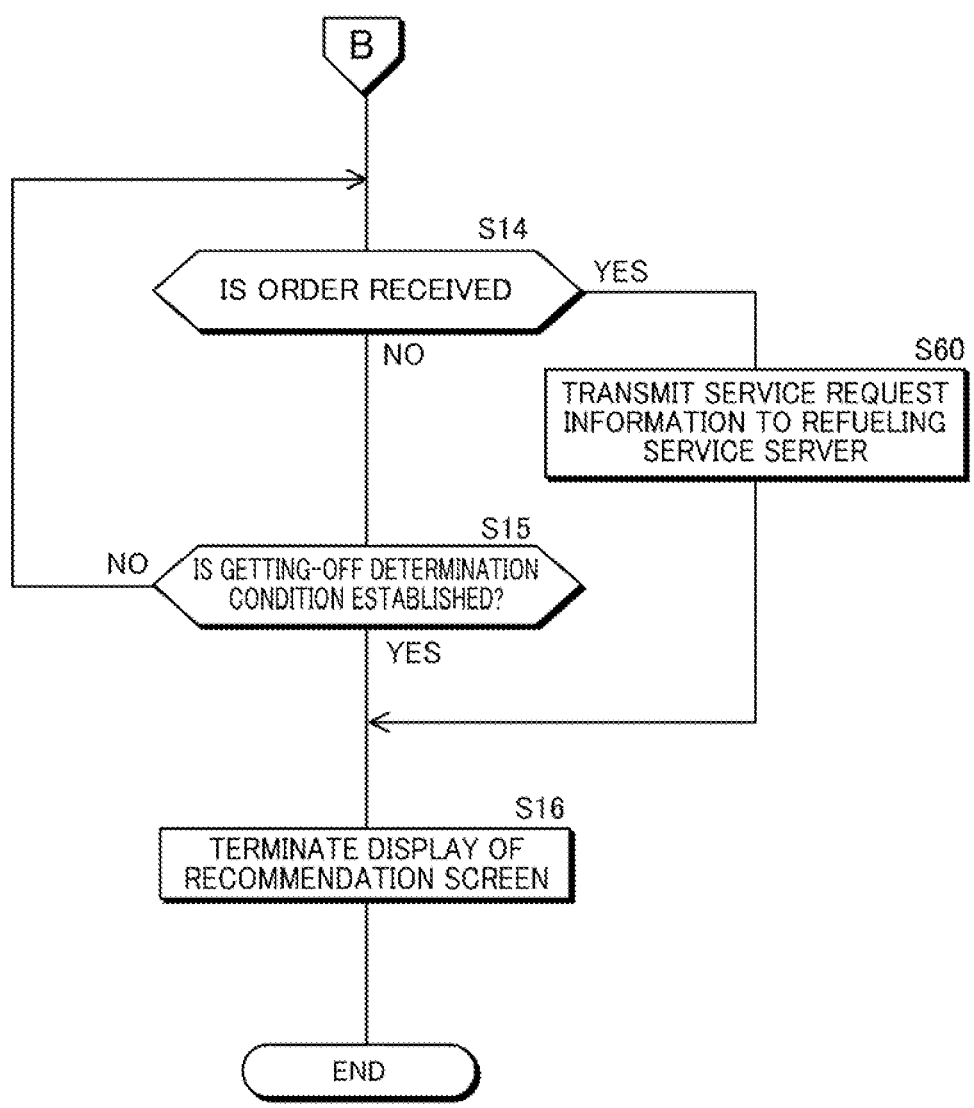
FIG. 6 is a third flowchart of the recommendation information output processing.
Figure 9:
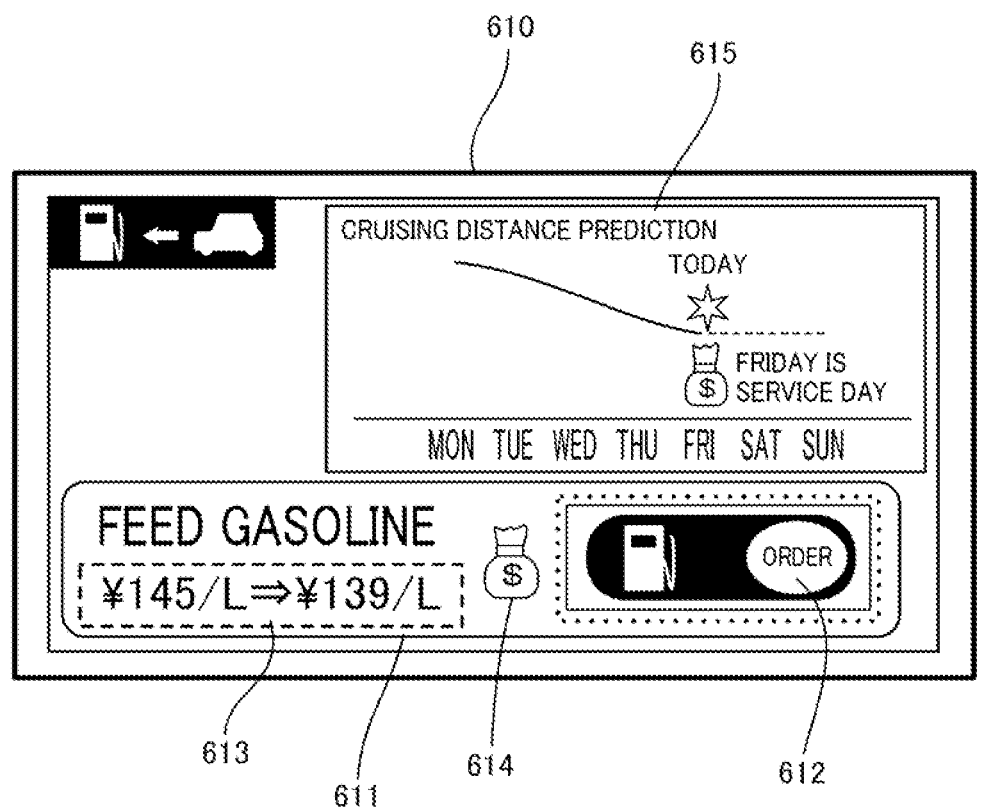
FIG. 9 is an explanatory view about the recommendation screen with campaign information superimposed.

In step S20, the recommendation information output unit 14 prepares data on a recommendation screen 610 in a format shown in FIG. 9, stores the data in the memory 30, and advances the processing to step S10 in FIG. 5. The recommendation screen 610 displays a guide part 611 of the gasoline delivery service and a cruising distance prediction guide part 615 indicating a predicted cruising distance and also indicating that today is a service day. The gasoline delivery service guide part 611 displays a special sale price for the price of gasoline 613, a special sale icon 614, and an order button 612. The order button 612 is highlighted by changing the color or flushing in contrast to the normal recommendation screen described later.

In step S6, the movable distance recognition unit 17 calculates a travelable distance with the remaining amount of gasoline. In next step S7, the recommendation information output unit 14 determines whether or not a scheduled travel distance in a drive plan of the vehicle 1 planned by the user U as recognized from the schedule information 34 exceeds the travelable distance. Then, the recommendation information output unit 14 advances the processing to step S30 when the scheduled travel distance exceeds the travelable distance, and advances the processing to step S8 in FIG. 5 when the scheduled travel distance is equal to or less than the travelable distance.

Figure 10:
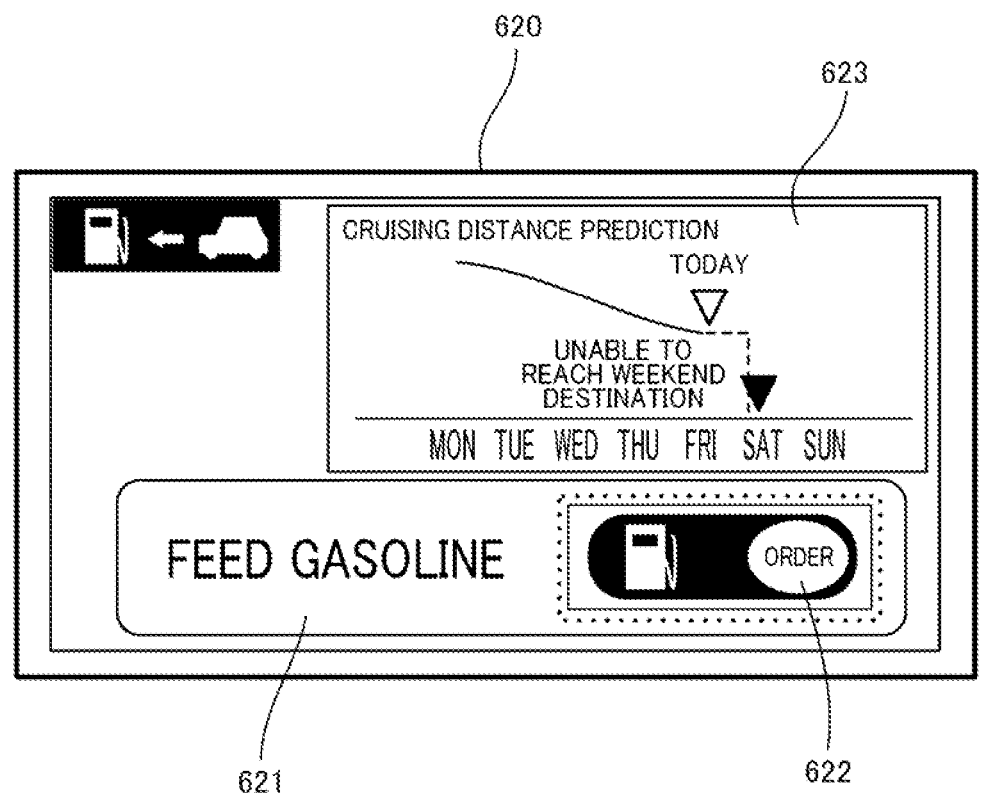
FIG. 10 is an explanatory view about the recommendation screen with unreachable information superimposed.

In step S40, the recommendation information output unit 14 prepares data on a recommendation screen 620 in a format shown in FIG. 10, stores the data in the memory 30, and advances the processing to step S10 in FIG. 5. The recommendation screen 620 displays a guide part 621 for the gasoline delivery service and a cruising distance prediction guide part 623 indicating that a destination in the drive plan of the weekend planned by the user U is not reachable with the current remaining amount of gasoline. On the gasoline delivery service guide part 621, an order button 622 is displayed. The order button 612 is highlighted by changing the color or flushing in contrast to the normal recommendation screen described later.

In step S8 in FIG. 5, the movable distance recognition unit 17 determines whether or not the remaining amount of gasoline detected by the remaining oil amount sensor 121 is less than a determination amount. Then, when the remaining amount of gasoline is less than the determination amount, the movable distance recognition unit 17 calculates, based on a movement schedule of the user U by the vehicle 1 as recognized from the schedule information 34, a time limit that the vehicle 1 can travel with the current remaining amount of gasoline, and advances the processing to step S40. Meanwhile, when the remaining amount of gasoline is equal to or more than the determination amount, the movable distance recognition unit 17 advances the processing to step S9.

Figure 11:
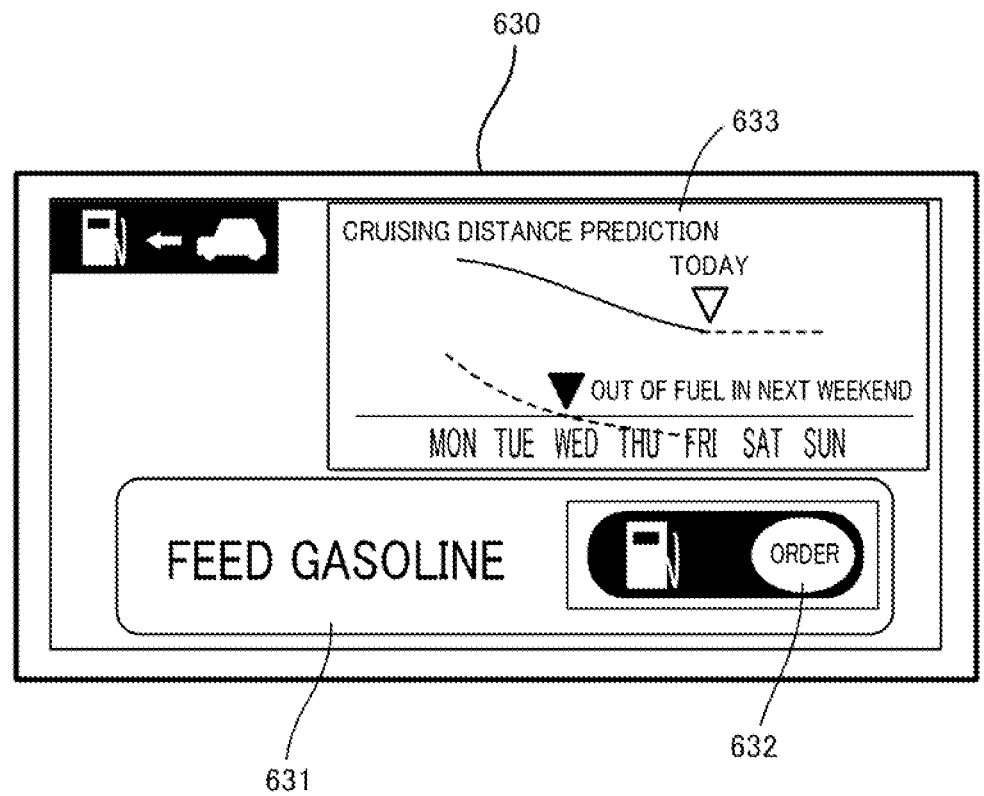
FIG. 11 is an explanatory view about the recommendation screen with travelable time limit information superimposed.

In step S40, the recommendation information output unit 14 displays a recommendation screen 630 in the form shown in FIG. 11 on the touchpanel 90. The recommendation screen 630 displays a guide part 631 for the gasoline delivery service and a cruising distance prediction guide part 633 notifying that the vehicle is out of fuel in the next weekend with the current remaining amount of gasoline. On the gasoline delivery service guide part 631, an order button 632 is displayed. The order button 632 is highlighted by changing the color or flushing in contrast to the normal recommendation screen described later.

Figure 8:
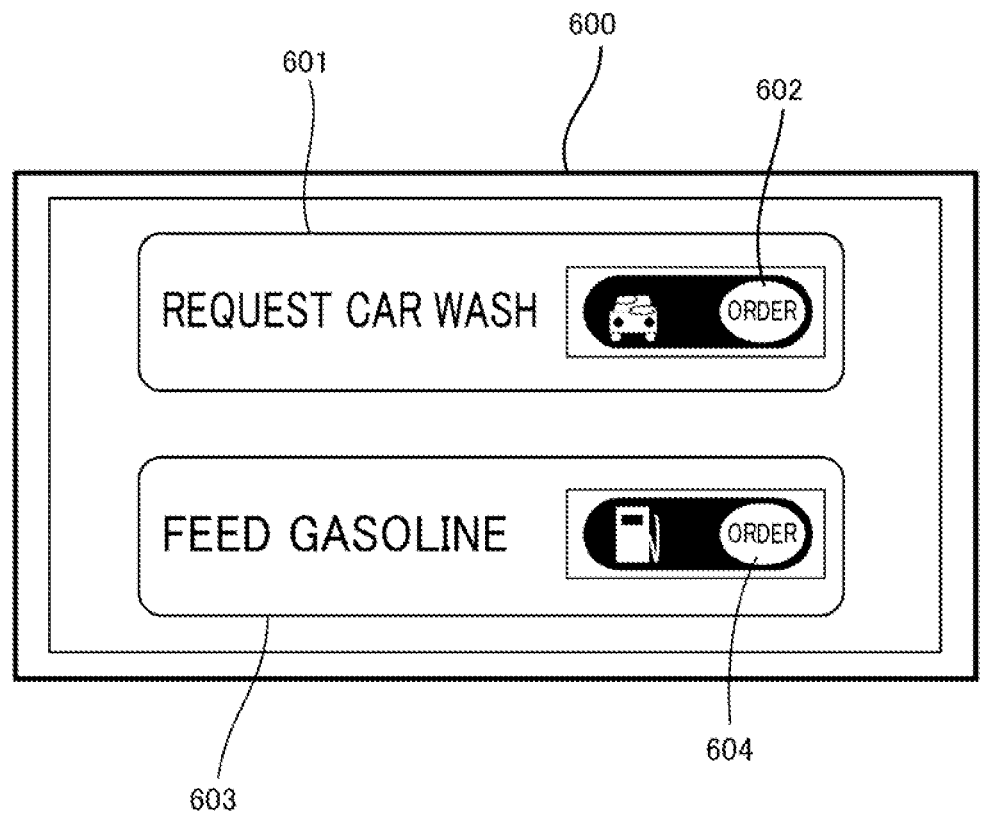
FIG. 8 is an explanatory view about a recommendation screen for the gasoline delivery service and a car wash service.

In step S9, the recommendation information output unit 14 prepares data on the normal recommendation screen 600 shown in FIG. 8, and stores the data in the memory 30. The recommendation screen 600 displays a guide part 601 for a car wash service and a guide part 603 for the gasoline delivery service. An order button 602 is displayed on the guide part 601 for the car wash service, and an order button 604 for the gasoline delivery service is displayed on the guide part 603 for the gasoline delivery service.

In following step S10, the speed recognition unit 19 advances the processing to step S11 when the vehicle speed of the vehicle 1 is 10 km/h or less, and advances the processing to step S50 when the vehicle speed of the vehicle 1 exceeds 10 km/H. In step S50, the recommendation information output unit 14 discards the prepared data on the recommendation screen, and advances the processing to step S2 in FIG. 4.

In step S11, the user behavior recognition unit 13 recognizes the behavior of the user U. In following step S12, the recommendation information output unit 14 advances the processing to step S13 when the user behavior recognition unit 13 recognizes a specific behavior estimated to be a behavior of the user U getting off the vehicle 1, and advances the processing to step S10 when the user behavior recognition unit 13 does not recognize the specific behavior.

Here, the user behavior recognition unit 13 recognizes the operation to turn off the power source switch 54 as the specific behavior estimated to be a behavior of the user U getting off the vehicle 1. Note that the user behavior recognition unit 13 may recognize the specific behavior estimated to be a behavior of the user U getting off the vehicle based on the image photographed by the front-seat camera 45. The user behavior recognition unit 13 may also recognize that the user U performs the specific behavior when the detection signal of the door switch 80 on the right front door 2 is turned off (door opened state) or the detection signal of the seatbelt switch 60 in the driver seat 7a is turned off (seatbelt unfastened state).

In step S13, the recommendation information output unit 14 displays the recommendation screen prepared in steps S20, S30, S40, or S9 on the touchpanel 90. By the loop of following steps S14 and S15 in FIG. 6, the service request reception unit 15 receives a service request by touch operation on the order button in step S14 until a getting-off determination condition is established in step S15.

The user U can request the gasoline delivery service by visually recognizing any one of the recommendation screens 600, 610, 620 and 630, and performs touch operation of any one of the order buttons 604, 612, 622 and 632. The user U can also request the car wash service by touching the order button 602 on the recommendation screen 600.

The service request reception unit 15 advances the processing to step S60 when recognizing the touch operation of any of the order buttons 604, 612, 622 and 632 in step S14. The service request reception unit 15 then transmits service request information Sodr (see FIG. 1) for requesting the car wash service to the refueling service server 200, and advances the processing to step S16. The service request reception unit 15 also advances the processing to step S60 when recognizing the touch operation of the order button 602 in step S14. The service request reception unit 15 then transmits service request information Sodr for requesting the car wash service to the vehicle 1 to the refueling service server 200, and advances the processing to step S16.

In step S15, the recommendation information output unit 14 determines whether or not the getting-off determination condition to determine that the user U has gotten off the vehicle 1 is established. In the present embodiment, it is set as the getting-off determination condition to recognize that the detection signal of the door switch 80 of the right front door 2 is changed to ON (closed state detected), OFF (opened state detected), and ON (closed state detected) in this order. Instead of determination by the door switch 80 or in addition to the determination by the door switch 80, the user U getting off the vehicle 1 may be recognized by using the detection signal of the lock switch of the door locking mechanism 100 for the right front door 2, the image photographed by the front-seat camera 45, the image photographed by the rear-seat camera 46, and the image photographed by the right side camera 41, or the like.

When the getting-off determination condition is established, the recommendation information output unit 14 advances the processing to step S15 to terminate display of the recommendation screen on the touchpanel 90.

Figure 7:
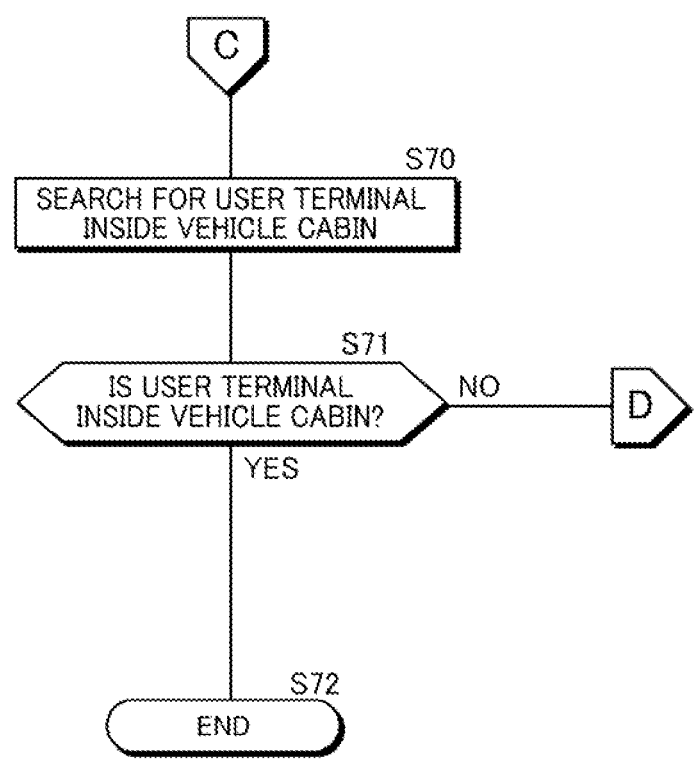
FIG. 7 is a fourth flowchart of the recommendation information output processing.

Next, steps S70 to S71 in FIG. 7 are processings to deal with the case where the user U rides on the vehicle 1 while forgetting to carry the user terminal 150 (see FIG. 2). The user terminal recognition unit 18 recognizes whether or not the user terminal 150 is inside the vehicle cabin of the vehicle 1 based on the communication status of the communication unit 130. Note that even in the case where the user terminal 150 and the communication unit 130 are out of communication due to battery exhaustion, the user terminal recognition unit 18 can recognize that the user terminal 150 is not inside the vehicle cabin.

In following step S71, the user terminal recognition unit 18 advances the processing to step S72 when recognizing that the user terminal 150 is inside the vehicle cabin. In this case, the recommendation information output unit 14 does not display the recommendation screen on the touchpanel 90. On the other hand, when recognizing that the user terminal 150 is not inside the vehicle cabin, the user terminal recognition unit 18 advances the processing to step S2 in FIG. 4.

Accordingly, in the situation where the user U forgets to carry the user terminal 150 and is unable to request the gasoline delivery service, or other services, through the user terminal 150, the recommendation information output unit 14 displays the recommendation screen on the touchpanel 90 even when the display of the recommendation screen is set to "prohibited". Hence, the user U can perform touch operation on the touchpanel 90 to request the gasoline delivery service or other services.

5. Other Embodiments

In the above embodiment, although the prescribed service of the present invention is illustrated as delivery of gasoline to the vehicle 1 ((refueling of gasoline), the prescribed service of the present invention is not limited to this. For example, the prescribed service may be a power supply service for electric vehicles, a car wash service, or a delivery service of articles to the vehicles. The prescribed service of the present invention is not limited to those related to the vehicles. For example, the prescribed service may be delivery of daily necessities or foods and drinks to user home.

In the above embodiment, although the moving body of the present invention is illustrated as a four-wheel vehicle 1, the present invention is applicable to various kinds of moving bodies for riding, such as two-wheel vehicles, aircrafts, and ships.

In the above embodiment, the recommendation information output unit 14 outputs the recommendation information by displaying the recommendation screens on the touchpanel 90. In another embodiment, instead of or in addition to displaying the recommendation screen, recommendation sound may be output from the speaker 91 to output the recommendation information. Moreover, a service request may be received by recognizing the voice of the user U with a microphone which is not shown.

In the above embodiment, the recommendation information output unit 14 displays the recommendation screen on the touchpanel 90, when the user behavior recognition unit 13 recognizes the getting-off behavior of the user U. In another embodiment, when a plurality of pieces of recommendation information are present, priority may be set for the recommendation information, the recommendation information high in priority may be output during a first prescribed period until completion of the getting-off behavior of the user U after recognition of the getting-off behavior of the user U, and the recommendation information low in priority may be output during a second prescribed period set outside the first prescribed period. The priority of the recommendation information is set, for example, in proportion to the cost that service providers pay for the output of the recommendation information, so that the higher the cost is, the higher the priority is set.

Moreover, in the first prescribed period, the order button may be displayed as described above to allow immediate reception of the order, whereas in the second period, the order button may be hidden. In the first prescribed period, the recommendation information may be output by means of screen display and sound, whereas in the second prescribed period, the recommendation information may be output only by sound.

In the above embodiment, in step S1 in FIG. 4, it is determined whether or not display of recommendation is set to "prohibited", and then the processing to deal with the case where the user U forgets to carry the user terminal 150 is executed in FIG. 7. However, this processing may be omitted.

In the above embodiment, in steps S20 and S30 in FIG. 4, and step S40 in FIG. 5, the processings to superimpose the campaign information, the unreachable information, and the travelable time limit information on the recommendation screen are performed. However, some or all of these processings may be omitted.

In the above embodiment, when the gasoline delivery service is requested, the service request reception unit 15 may unlock the fuel filler port lid 110 to allow the vehicle 1 to be filled with gasoline. In this case, for example, the service request reception unit 15 may unlock the fuel filler port lid 110 in time that the vehicle 1 is scheduled to be refueled with gasoline. Alternatively, the fuel filler port lid 110 may be unlocked by transmitting to a delivery staff terminal (not shown) used by the delivery staff S an authorization code for unlocking the fuel filler port lid 110.

Note that FIG. 3 is a schematic view in which the functional configuration of the information providing device 10 is categorized and shown according to main processing contents for easy understanding of the present invention, and therefore, the configuration of the information providing device 10 may be configured according to other categories. The processing of each component member may be executed by a single hardware unit or may be executed by a plurality of hardware units. The processing by each component member shown in FIGS. 4 to 7 can be executed by a single program or by a plurality of programs.

6. Configuration Supported by Aforementioned Embodiment

The aforementioned embodiment is a specific example of the following configuration.

(First Aspect) An information providing device for use in a moving body, including: a user behavior recognition unit configured to recognize a behavior of a user boarding on the moving body; a recommendation information output unit configured to output recommendation information regarding a prescribed service when the user behavior recognition unit recognizes a specific behavior estimated to be a behavior of the user getting off the moving body; and a service request reception unit configured to receive a request for the prescribed service when the recommendation information output unit outputs the recommendation information.

According to the information providing device in the first aspect, at the timing when the user is freed from traveling by the moving body and relaxed, the recommendation information output unit outputs recommendation information for a prescribed service. This makes it possible to increase an appealing effect of the prescribed service to the user. When the user desires the prescribed service, the user can request the prescribed service on the spot. Therefore, it is possible to provide recommendation information to the user of the moving body at appropriate timing and encourage the user to make good use of the recommendation information.

(Second Aspect) The information providing device according to the first aspect, in which the recommendation information output unit is configured to output the recommendation information by displaying a recommendation screen containing a content of the prescribed service on a display unit provided in the moving body, and the service request reception unit displays a request reception area for the prescribed service on the recommendation screen and receives a request for the prescribed service when a selecting operation is performed in the request receiving area.

According to the information providing device in the second aspect, when the user who has visually recognized the recommendation screen desires to provide the prescribed service, the user can easily make a request for the prescribed service by performing selecting operation in the request reception area displayed on the recommendation screen.

(Third Aspect) The information providing device according to the first or second aspect, including a communication control unit configured to control a communication unit used in the moving body, and transmit, when the service request reception unit receives the request for the prescribed service, service request information for requesting the prescribed service to a service management server that manages provision of the prescribed service via the communication unit.

According to the information providing device in the third aspect, the communication unit used in the moving body can request the prescribed service to the service provision server.

(Fourth Aspect) The information providing device according to any one of the first to third aspects, in which the prescribed service is a refueling service or a power supply service for the moving body.

According to the information providing device in the fourth aspect, after the user finishes using the moving body and gets off the moving body, refueling of the moving body or power supply to the mobile body can be performed while the mobile body is not in use.

(Fifth Aspect) The information providing device according to the fourth aspect, in which the recommendation information includes an estimated cost of the fueling service or the power supply service.

According to the information providing device in the fifth aspect, the user of the moving body can request the refueling service or the power supply service after understanding the cost of the refueling service or the power supply service in advance.

(Sixth Aspect) The information providing device according to the fourth or fifth aspect, including a movable distance recognition unit configured to recognize a movable distance with a remaining oil amount or a remaining electric storage amount of the moving body, in which the recommendation information includes the movable distance.

According to the information providing device in the sixth aspect, the user of the moving body can determine whether or not to request the refueling service or the power supply service after understanding the movable distance of the moving body in the current status.

(Seventh Aspect) The information providing device according to any one of the fourth to sixth aspects, in which the service request reception unit unlocks a lid of a fuel filler port or a power supply port provided on the moving body, when receiving the request for the prescribed service.

The information providing device in the seventh aspect can facilitate the work of a person in charge of the refueling service or the power supply service for the moving body.

(Eighth Aspect) The information providing device according to any one of the first to seventh aspects, including a user terminal recognition unit configured to recognize that a user terminal carried and used by the user is inside a cabin of the moving body, in which the recommendation information output unit outputs the recommendation information, when the user terminal recognition unit does not detect that the user terminal is inside the cabin of the moving body, and the user behavior recognition unit recognizes the specific behavior of the user.

According to the information providing device in the eighth aspect, when the user is unable to request the prescribed service through the user terminal because the user rides on the moving body while forgetting to carry the user terminal, the recommendation information is output to make it possible to request the prescribed service.

(Ninth Aspect) The information providing device according to any one of the first to eighth aspects, including a speed recognition unit configured to recognize speed of the moving body, in which the recommendation information output unit outputs the recommendation information when the speed of the moving body recognized by the speed recognition unit is a prescribed speed or less, and the user behavior recognition unit recognizes the specific behavior.

According to the information providing device in the ninth aspect, the recommendation information can be output at the time when the moving body is in a stopped state or in a state just before stopping.

(Tenth Aspect) The information providing device according to any one of the first to ninth aspects, wherein the recommendation information output unit stops output of the recommendation information when the user behavior recognition unit recognizes that the user gets off the moving body during output of the recommendation information.

According to the information providing device in the tenth aspect, it is possible to avoid unnecessary energy consumption caused by continuous output of the recommendation information even after the user gets off the moving body.

(Eleventh Aspect) An information providing device for use in a moving body, including: a user behavior recognition unit configured to recognize a behavior of a user boarding on a moving body; and a recommendation information output unit configured to output recommendation information for a first prescribed service until a first prescribed period elapses from a point of time when the user behavior recognition unit recognizes a specific behavior estimated to be a behavior of the user getting off the moving body, and output recommendation information for a second prescribed service that is lower in priority than the first prescribed service during a second prescribed period set outside the first prescribed period.

According to the information providing device in the eleventh aspect, the recommendation information for the first predefined service that is higher in priority is output during the first prescribed period in which the user starts a behavior for getting off the moving body and no longer needs to concentrate on the movement so that it is assumed that an acceptance level of the user for the recommendation information is higher. This makes it possible to increase a proposal effect of the first specified service.

(Twelfth Aspect) The information providing device according to the eleventh aspect, including a service reception unit configured to receive a request for the first prescribed service during the first prescribed period, and prohibit reception of a request for the second prescribed service during the second prescribed period.

According to the information providing device in the twelfth aspect, receiving a request for the first prescribed service higher in priority can promote use of the first prescribed service.

REFERENCE SIGNS LIST

1 VEHICLE (MOVING BODY), 2 RIGHT FRONT DOOR, 3 LEFT FRONT DOOR, 4 RIGHT REAR DOOR, 5 LEFT REAR DOOR, 6 TAILGATE, 10 INFORMATION PROVIDING DEVICE, 11 VEHICLE USE INFORMATION ACQUISITION UNIT, 12 STORE INFORMATION ACQUISITION UNIT, 13 USER BEHAVIOR RECOGNITION UNIT, 14 RECOMMENDATION INFORMATION OUTPUT UNIT, 15 SERVICE REQUEST RECEPTION UNIT, 16 COMMUNICATION CONTROL UNIT, 17 MOVABLE DISTANCE RECOGNITION UNIT, 18 USER TERMINAL RECOGNITION UNIT, 19 SPEED RECOGNITION UNIT, 30 MEMORY, 31 CONTROL PROGRAM, 32 TRAVEL HISTORY INFORMATION, 33 STORE INFORMATION, 34 SCHEDULE INFORMATION, 90 TOUCHPANEL (DISPLAY UNIT), 150 USER TERMINAL, 200 REFUELING SERVICE SERVER (SERVICE MANAGEMENT SERVER), U USER.

The invention claimed is:

1. An information providing device for use in a moving body, comprising a CPU (central processing unit), wherein the CPU functions as:
   a user behavior recognition unit configured to recognize a behavior of a user boarding the moving body;
   a recommendation information output unit configured to output recommendation information for a prescribed service when the user behavior recognition unit recognizes a specific behavior estimated to be a behavior of the user performing an operation to turn off a power source switch of the moving body; and
   a service request reception unit configured to receive a request for the prescribed service until it is determined by the user behavior recognition unit that the user has gotten off from the moving body when the recommendation information output unit outputs the recommendation information, wherein
   the prescribed service is a service performed when the user is not boarding the moving body.

2. The information providing device according to claim 1, wherein:
   the recommendation information output unit outputs the recommendation information by displaying a recommendation screen containing a content of the prescribed service on a display provided in the moving body; and
   the service request reception unit displays a request reception area for the prescribed service on the recommendation screen, and receives a request for the prescribed service when a selecting operation is performed in the request receiving area.

3. The information providing device according to claim 1, wherein the CPU further functions as a communication control unit configured to
   control a communication unit used in the moving body, and
   transmit, when the service request reception unit receives the request for the prescribed service, service request information for requesting the prescribed service to a service management server that manages provision of the prescribed service via the communication unit.

4. The information providing device according to claim 1, wherein the prescribed service is a refueling service or a power supply service for the moving body.

5. The information providing device according to claim 4, wherein the recommendation information includes an estimated cost of the refueling service or the power supply service.

6. The information providing device according to claim 4, wherein the CPU further functions as a movable distance recognition unit configured to recognize a movable distance with a remaining oil amount or a remaining electric storage amount of the moving body, wherein
the recommendation information includes the movable distance.

7. The information providing device according to claim 4, wherein the CPU, by the service request reception unit, unlocks a lid of a fuel filler port or a power supply port provided on the moving body, when receiving the request for the prescribed service.

8. The information providing device according to claim 1, wherein the CPU further functions as a user terminal recognition unit configured to recognize that a user terminal carried and used by the user is inside a cabin of the moving body based on whether communication between the user terminal and a communication unit is disabled, wherein
the recommendation information output unit displays the recommendation information on a display provided in the moving body, when the user terminal recognition unit does not detect that the user terminal is inside the cabin of the moving body, and the user behavior recognition unit recognizes the specific behavior of the user.

9. An information providing device for use in a moving body, comprising a CPU (central processing unit), wherein the CPU functions as:
a user behavior recognition unit configured to recognize a behavior of a user boarding the moving body; and
a recommendation information output unit configured to
output recommendation information for a first prescribed service until a first prescribed period elapses from a point of time when the user behavior recognition unit recognizes a specific behavior estimated to be a behavior of the user performing an operation to turn off a power source switch of the moving body, and
output recommendation information for a second prescribed service that is lower in priority than the first prescribed service during a second prescribed period set outside the first prescribed period and until it is determined by the user behavior recognition unit that the user has gotten off from the moving body.

10. The information providing device according to claim 9, wherein the CPU further functions as a service reception unit configured to
receive a request for the first prescribed service during the first prescribed period, and
prohibit reception of a request for the second prescribed service during the second prescribed period.

* * * * *